(12) United States Patent
Block et al.

(10) Patent No.: US 12,448,109 B2
(45) Date of Patent: Oct. 21, 2025

(54) AUXILIARY FLAP ASSEMBLY FOR AIRCRAFT

(71) Applicant: The Boeing Company, Arlington, VA (US)

(72) Inventors: Samuel L. Block, Bothell, WA (US); Kevin Tsai, Redmond, WA (US)

(73) Assignee: The Boeing Company, Arlington, VA (US)

( * ) Notice: Subject to any disclaimer, the term of this patent is extended or adjusted under 35 U.S.C. 154(b) by 40 days.

(21) Appl. No.: 18/313,097

(22) Filed: May 5, 2023

(65) Prior Publication Data
US 2024/0367773 A1 Nov. 7, 2024

(51) Int. Cl.
*B64C 9/18* (2006.01)
*B64C 9/02* (2006.01)
*F16C 19/14* (2006.01)

(52) U.S. Cl.
CPC ............... *B64C 9/18* (2013.01); *B64C 9/02* (2013.01); *F16C 19/14* (2013.01); *F16C 2326/43* (2013.01)

(58) Field of Classification Search
CPC ............... B64C 9/16; B64C 9/18; B64C 9/20
See application file for complete search history.

(56) References Cited

U.S. PATENT DOCUMENTS

| 4,995,575 A | * | 2/1991 | Stephenson | B64C 9/16 244/216 |
| 11,186,356 B2 | * | 11/2021 | Schlipf | B64C 9/24 |
| 2014/0158822 A1 | * | 6/2014 | Langley | B64C 9/02 244/99.3 |

OTHER PUBLICATIONS

Rudolph, P., High-Lift Systems on Commercial Subsonic Airliners, Sep. 1996, p. 1-166, NASA Contractor Report 4746, National Aeronautics and Space Administration.
File:Flaps Mechanism B787 A320.png, accessed from https://commons.wikimedia.org/wiki/File:Flaps_Mechanism_B787_A320.png on May 15, 2023.

* cited by examiner

*Primary Examiner* — Timothy D Collins
*Assistant Examiner* — Terri L Filosi
(74) *Attorney, Agent, or Firm* — Kunzler Bean & Adamson

(57) ABSTRACT

An auxiliary flap assembly includes a track, a wingbox attachment, and a flap carriage. The wingbox attachment is attached to an aircraft wing and to the track such that the track is pivotable relative to the aircraft wing. The flap carriage is movably engaged with the track such that the flap carriage is retained by and movable along a length of the track. The flap carriage includes a top portion, a bottom portion, and an intermediate portion. The top portion includes a spherical bearing coupled to the flap. The bottom portion includes a pair of primary rollers configured to roll along the bottom surface of the track and the intermediate portion includes a pair of secondary rollers configured to roll along opposing C-shaped channels of the track.

20 Claims, 6 Drawing Sheets

AUXILIARY FLAP ASSEMBLY FOR AIRCRAFT

FIELD

This disclosure relates generally to mechanical systems for securing and stabilizing aircraft wing flaps, and more particularly to auxiliary flap assemblies that are failsafe and jam-resistant.

BACKGROUND

A flap is a high lift device typically consisting of a movable panel or panels mounted on an aircraft wing, such as the trailing edge of the wing. The flap's setting (e.g., the position and orientation of the flap relative to the wing) can be adjusted to increase the camber and, in some applications, the chord and surface area of the wing. The wing's camber can indicate the convexity of the upper part of the wing and the concavity of the lower part of the wing. Extending flaps during flight can increase lift and drag while also reducing stall speed, which can improve the aircraft's performance during takeoffs and landings. During a landing, the extended flaps enable the aircraft to travel at lower landing speeds that can reduce the length of the landing strip required. Extended flaps can also increase drag, which enables the aircraft to steepen its descent angle without increasing overall airspeed.

The configurations of the flaps can vary across different types of aircraft. For instance, large jetliners are often designed with flaps that have multiple portions (e.g., three-part flaps) while smaller aircrafts have appropriately sized flaps that attach to the wings via hinges. To adjust the settings of the flaps, flap systems are built into the wings, which can include actuators to extend or retract the flaps to effectively change the profiles and surface areas of wings. In addition to the actuators, flap systems can also incorporate auxiliary support structures that help stabilize and align the flaps during different settings.

SUMMARY

The subject matter of the present application has been developed in response to the present state of the art, and in particular, in response to the shortcomings of current auxiliary flap assemblies that tend to be bulky, heavy, and require large fairings. Known auxiliary flap assemblies are also susceptible to debris accumulating between rollers and the flap assembly track, which can cause the rollers to jam and/or break. These failures tend to result in the introduction of abnormally high bending loads into the flap and/or wing of the aircraft, which can affect performance of the aircraft. These shortcomings have not yet been fully solved by currently available techniques.

Accordingly, the subject matter of the present application has been developed to provide a failsafe, jam-resistant auxiliary flap assembly to overcome at least some of the above-discussed shortcomings of prior art techniques. The following is a non-exhaustive list of examples, which may or may not be claimed, of the subject matter disclosed herein.

According to one aspect of the disclosure, an auxiliary flap assembly is provided for an aircraft wing having a flap. In some embodiments, the auxiliary flap assembly includes a track, a wingbox attachment, and a flap carriage. In some embodiments, the track is configured to be coupled to the aircraft wing. The track includes a top surface, a bottom surface, and opposing C-shaped channels, which are elongated along a length of the track.

In some embodiments, the wingbox attachment is configured to be attached to the aircraft wing. In some embodiments, the wingbox attachment is pivotably coupled with the track such that the track is pivotable relative to the aircraft wing.

In some embodiments, the flap carriage is movably engaged with the track such that the flap carriage is retained by the track and movable along the length of the track. The flap carriage includes a top portion, a bottom portion, and an intermediate portion between the top portion and the bottom portion. In some embodiments, the top portion includes a spherical bearing. In some embodiments, the top portion is configured to be coupled to the flap via the spherical bearing. In some embodiments, the bottom portion includes a pair of primary rollers configured to roll along the bottom surface of the track and the intermediate portion includes a pair of secondary rollers. Each of the secondary rollers is configured to roll along a corresponding one of the opposing C-shaped channels. In some embodiments, the pair of primary rollers includes two flight-loaded rollers arranged in a tandem configuration.

In some embodiments, the track includes a first half and a second half in a back-to-back configuration. Each one of the first half and the second half defines a corresponding one of the opposing C-shaped channels. In some embodiments, the track is non-linear. In some embodiments, the top surface, the bottom surface, and each one of the opposing C-shaped channels are also non-linear. In some embodiments, the track has an inverted J-shape.

In some embodiments, the flap carriage includes a first side plate, a second side plate, and a pin. In some embodiments, the pin extends through the spherical bearing to couple the first side plate to the second side plate. In certain embodiments, the pin includes a pin-in-pin configuration.

According to a second aspect of the disclosure, in some embodiments, an aircraft is provided that includes an aircraft wing, a flap coupled to the aircraft wing, and a flap assembly coupling the flap to the aircraft wing. The flap assembly includes a track, a wingbox attachment, and a flap carriage.

In some embodiments, the track is coupled to the aircraft wing. The track includes a top surface, a bottom surface, and opposing C-shaped channels elongated along a length of the track. In some embodiments, the track includes a first half and a second half in a back-to-back configuration. The first half and the second half each define a corresponding one of the opposing C-shaped channels. In some embodiments, the track is non-linear, and the top surface, the bottom surface, and each one of the opposing C-shaped channels are also non-linear. In some embodiments, the track has an inverted J-shape.

In some embodiments, the wingbox attachment is attached to the aircraft wing and pivotably coupled with the track such that the track is pivotable relative to the aircraft wing. In some embodiments, the wingbox attachment is attached to the aircraft wing at a mid-span position or an end position along the wing. In some embodiments, the aircraft wing requires a minimal fairing at a position of the flap assembly.

In certain embodiments, a flap carriage is movably engaged with the track such that the flap carriage is retained by the track and movable along the length of the track. The flap carriage includes a top portion, a bottom portion, and an intermediate portion between the top portion and the bottom portion. In some embodiments, the top portion includes a spherical bearing and is coupled to the flap via the spherical bearing. In yet some embodiments, the bottom portion includes a pair of primary rollers configured to roll along the bottom surface of the track and the intermediate portion includes a pair of secondary rollers configured to roll along a corresponding one of the opposing C-shaped channels.

In some embodiments, the pair of primary rollers includes two flight-loaded rollers arranged in a tandem configuration. In certain embodiments, the flap assembly further includes a flap bracket attached to the flap, and the spherical bearing is retained by the flap bracket. According to some embodiments, the flap carriage includes a first side plate, a second side plate, and a pin that extends through the spherical bearing to couple the first side plate to the second side plate.

According to a third aspect of the disclosure, a method includes moving a flap carriage along a non-linear path defined by a track, so that a flap coupled to the flap carriage also moves along the non-linear path. When moving the flap carriage along the non-linear path, the method includes rotating the flap about a spherical bearing of the flap carriage into any one or more of an infinite number of orientations relative to the flap carriage. In some embodiments, moving the flap carriage along the non-linear path includes rolling a pair of primary rollers along a bottom surface of the track and rolling a pair of secondary rollers along opposing C-shaped channels of the track.

In some embodiments, the method further includes mounting the track to the aircraft wing at one of a mid-span position and an end position along the aircraft wing. In certain embodiments, the method further includes pivoting the track relative to the aircraft wing about an axis that is vertical (e.g., perpendicular to a spanwise direction and a chordwise direction along the aircraft wing.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

As discussed above, current auxiliary flap assemblies tend to be bulky, heavy, and require large fairings. In addition, known auxiliary flap assemblies are prone to jamming due to accumulation of debris inside the track. Various embodiments of the subject matter disclosed herein address these and other issues.

Figure 1:
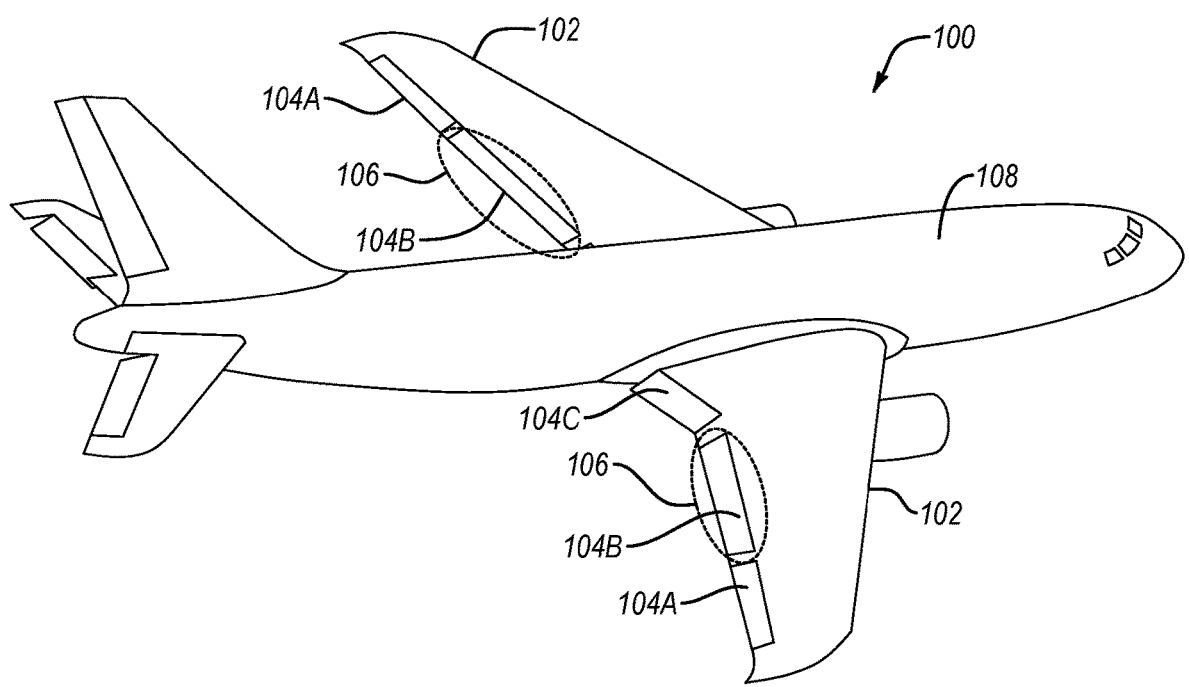
FIG. 1 is a perspective view of a fixed-wing aircraft with mechanical flap systems, according to one or more examples of the present disclosure.

Referring now to the Figures, FIG. 1 illustrates an aircraft 100 configured with flap operation systems that enable flap deflection during operation. In the example embodiment, the aircraft 100 includes two aircraft wings 102 with each aircraft wing 102 having multiple flaps labeled as a flap 104A, a flap 104B, and a flap 104C. In order to enable computing devices on the aircraft 100 to adjust the flaps 104A-104C during operations, each flap 104A-104C is connected to a flap operation system 106 that is built into the aircraft wings 102 and can be used to reposition the flaps 104A-104C relative to the aircraft wing 102. The flap operation system 106 may include operational components such as mechanical, hydraulic, electric, pneumatic, and/or other suitable operational components. For illustration purposes, the flap operation system 106 is outlined, in dashed line, in FIG. 1. Flaps 104A, 104C can similarly have flap operation systems (not outlined), which may operate collectively with the flap operation system 106 and/or independently during aircraft operations.

The aircraft 100 represents an example fixed-wing aircraft that may use flaps 104A-104C during operations, which can increase performance during takeoff and landing. When the flaps 104A-104C are positioned in an down orientation, the camber of the aircraft 100 enables the aircraft wings 102 to produce more lift. Depending on the aircraft 100, the flaps 104A-C may extend to various degrees. For instance, the aircraft 100 may extend the flaps 104A-C approximately 30 degrees during takeoff and 40 degrees during landing. After liftoff, the aircraft 100 may retract the flaps 104A-104C to avoid drag. As such, deploying the flaps 104A-104C can increase lift, which allows the aircraft 100 to climb during takeoff at slow speeds and also safely descend during landing, also at slow speeds.

Figure 2:
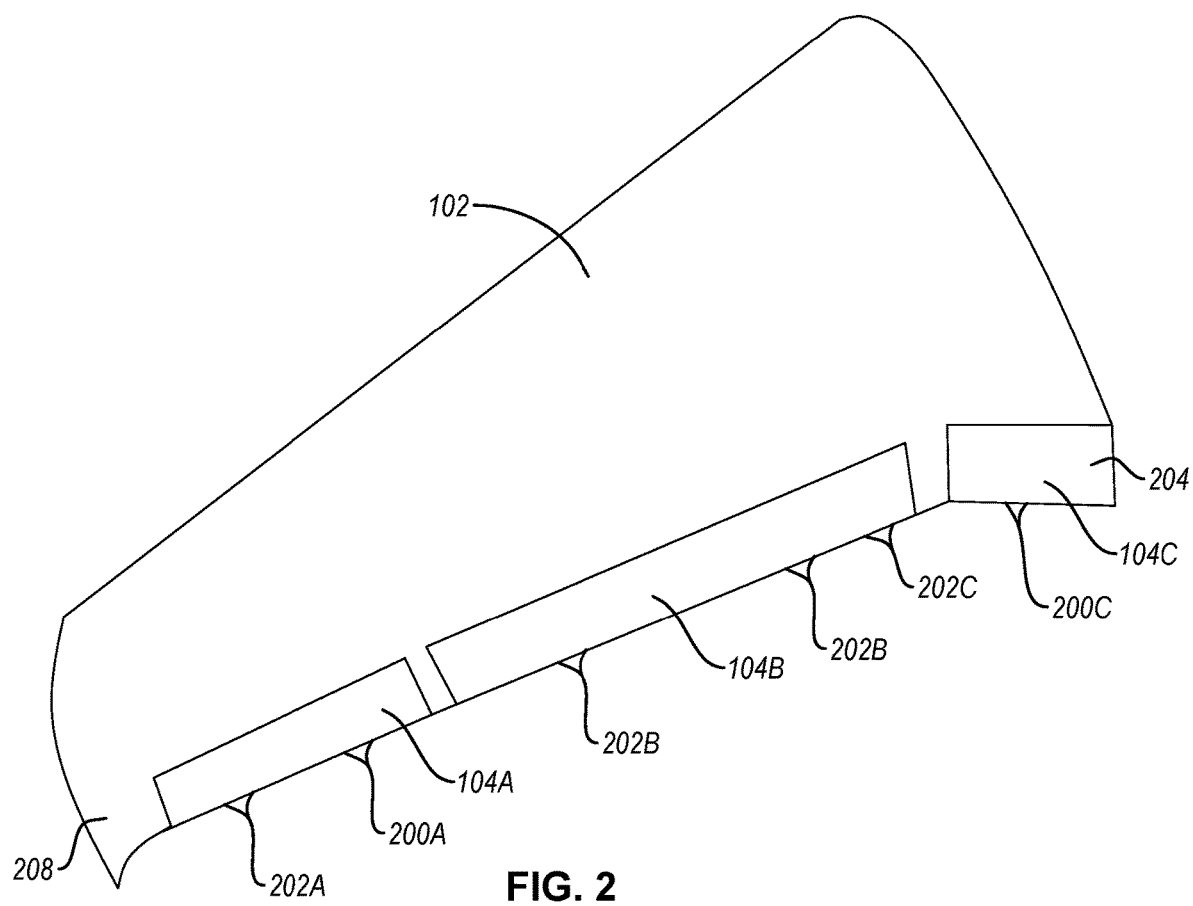
FIG. 2 is a top view of an aircraft wing with multiple flaps and flap support assemblies, according to one or more examples of the present disclosure.

Referring now to FIG. 2, to adjust the settings of the flaps 104A-104C, aircraft computing devices may transmit signals to one or more main flap support structures 200A-C positioned within and/or along the aircraft wings 102. For instance, the flap operation system 106 identified in FIG. 1 can include one or more main flap support structures 200A-C configured to generate force to adjust the setting of a corresponding flap 104A-C. As an example embodiment, each one of the main flap support structures 200A-C can include an actuator (not shown) such as a ball screw actuator, a geared rotary actuator, a linear hydraulic actuator, or any other suitable actuator, to extend or retract the corresponding one of the flaps 104A-C. In some instances, the aircraft 100 incorporates one or multiple main flap support structures 200A-C into flap operation systems 106 on the aircraft wings 102, including the flap operation systems 106 that enable deflection of the flaps 104A-C. In these and other embodiments, a fairing may be coupled to and/or integrated with the aircraft wing 102 at each of the main flap support structures 200A-C to at least partially cover the main flap support structures 200A-C for increasing streamlining and reducing drag.

In some embodiments, the aircraft 100 incorporates one or more auxiliary flap assemblies 202A-C to assist the main flap support structures 200A-C in stabilizing and aligning the flaps 104A-C during various settings. The auxiliary flap assemblies 202A-C lack an actuator and thus provide passive support that depends on actuation by the main flap support structures 200A-C or other support systems to drive or adjust the position of the flaps 104A-C. The auxiliary flap assemblies 202A-C and corresponding ones of the main flap support structures 200A-C may be kinematically compatible to drive motion of the flaps 104A-C in a desired direction. For example, in some embodiments, the disclosed auxiliary flap assemblies 202A-C are configured to support non-planar, helical motion of the flaps 104A-C.

The disclosed auxiliary flap assemblies 202A-C are designed with mechanical features that reduce manufacturing complexity, while also increasing resistance to potential jams during use. Additionally, in some embodiments, the auxiliary flap assemblies 202A-C have a reduced size and/or profile such that the aircraft wing 102 may require a minimal fairing or no fairing at the positions of the auxiliary flap assemblies 202A-C. In other embodiments, the auxiliary flap assemblies 202A, 202B require fairings that also have a reduced size and/or profile relative to the main flap support structure 200 fairings. This feature may enable the auxiliary flap assembly 202A-C to be attached to the aircraft wing 102 at any of a mid-span position, an inboard position 204, or an outboard position 208 along the aircraft wing 102 without adding significant weight and/or drag. In practice, the actuator of the main flap support structure 200A-C (or similar device) may supply the force to adjust the setting of an attached one of the flaps 104A-C, while the auxiliary flap assemblies 202A-C may provide additional support and stabilization.

In some embodiments, as shown in FIG. 2, the main flap support structures 200A-C and the auxiliary flap assemblies 202A-C are secured to the aircraft wing 102 at fixed positions. The main flap support structures 200A-C can be used to extend or retract the flaps 104A-C, which adjusts the profile and surface area of the aircraft wing 102 to enable efficient flight at low airspeeds. In some embodiments, each one of the main flap support structures 200A-C includes a lead screw actuator mechanism driven by an electric or hydraulic motor. The actuator of the main flap support structures 200A-C can be activated to extend or retract a corresponding one of the flaps 104A-C based on signals received from an aircraft computing system.

Figure 3A:
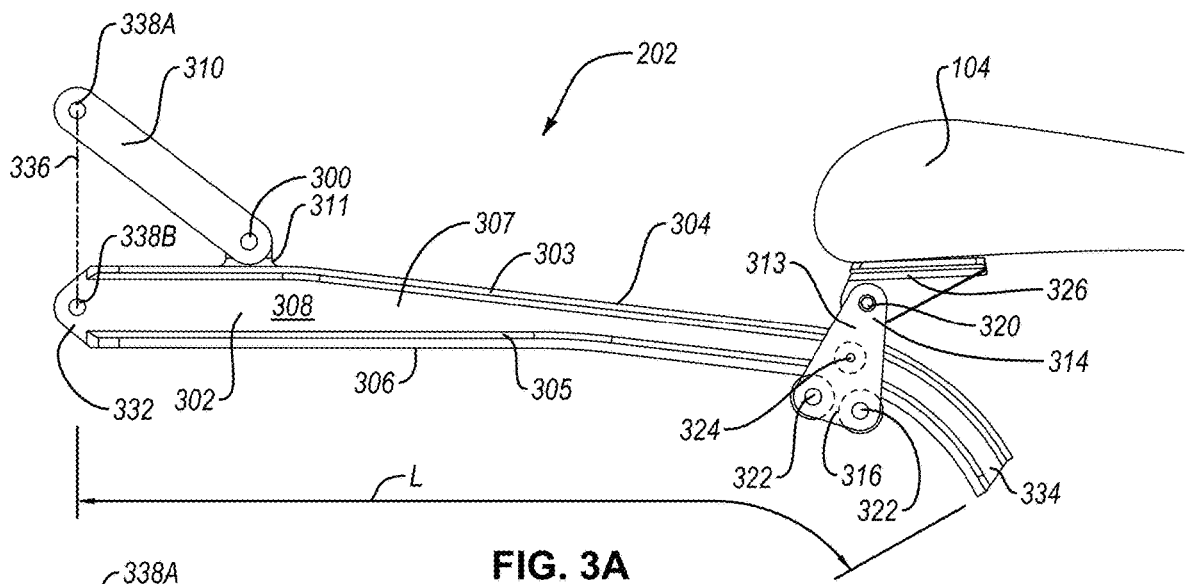
FIG. 3A is a side view of an auxiliary flap assembly, depicting a flap in a stowed position, in accordance with one or more examples of the present disclosure.
Figure 3B:
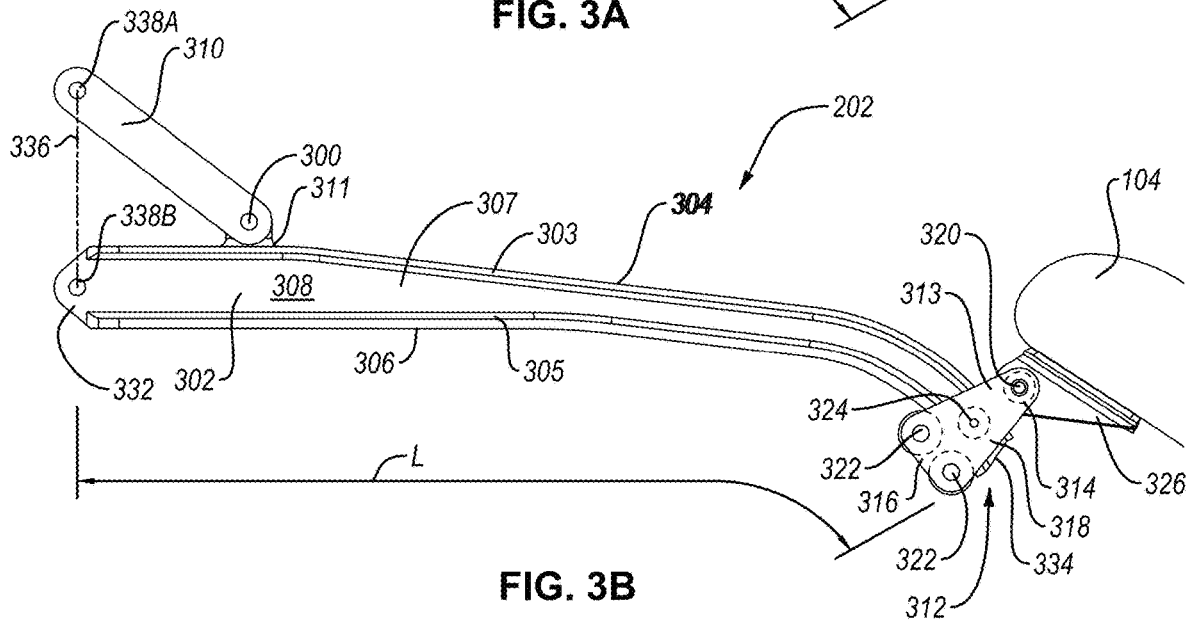
FIG. 3B is a side view of the auxiliary flap assembly of FIG. 3A, showing the flap in a deployed position, in accordance with one or more examples of the present disclosure.

Referring now to FIGS. 3A and 3B, in some embodiments, an auxiliary flap assembly 202 includes a track 302, a wingbox attachment 310, and a flap carriage 312. The track 302, the wingbox attachment 310, the flap carriage 312, and other various components of the auxiliary flap assembly 202 may be formed from one or more metals, such as steel, aluminum, iron, and/or any other suitable metal or metal alloy. The track 302, the wingbox attachment 310, the flap carriage 312, and other various components of the auxiliary flap assembly 202 may include parameters and dimensions compatible with the type of aircraft 100 incorporating the auxiliary flap assembly 202.

As shown, in some embodiments, a length ("L") of the track 302 is greater than a width of the track 302 to accommodate the aircraft wing 102 and the corresponding one of the flaps 104A-C. The length and overall structure of the track 302 can allow deflection of the corresponding one of the flaps 104A-C at various settings during operation of the aircraft 100. In some embodiments, the track 302 is configured to be coupled to the aircraft wing 102 via the wingbox attachment 310, such that the track 302 and the wingbox attachment 310 are substantially aligned, in a chordwise direction, and the length of the track 302 extends approximately parallel to the body 108 of the aircraft 100 (e.g., in the chordwise direction). In some embodiments, the wingbox attachment 310 may be fixed to the aircraft wing 102 at one or more attachment points 338A via one or more mechanical fasteners including, for example, bolts, screws, adhesives, welding, and/or a combination thereof.

In some embodiments, the wingbox attachment 310 and the track 302 are configured to move together. In certain embodiments, both the wingbox attachment 310 and the track 302 may be configured to pivot or rotate about an axis 336 extending vertically (e.g., perpendicularly relative to a chordwise and a spanwise direction along the aircraft wing 102). In some embodiments, the axis 336 extends vertically through a first one of the attachment points 338A (e.g., a spherical bearing or other rotational joint) between the wingbox attachment 310 and the aircraft wing 102 and a second attachment point 338B (e.g., a spherical bearing or other rotational joint) between the track 302 and the aircraft wing 102. In some embodiments, both the wingbox attachment 310 and the track 302 are configured to rotate together about the axis 336.

In some embodiments, the wingbox attachment 310 and the track 302 are monolithically formed as a single unit. In other embodiments, the wingbox attachment 310 and the track 302 are separately manufactured and coupled together at a connection point 300. In some embodiments, as shown, the track 302 includes a tab 311 that is coupled to and extends upwardly away from a top surface 304 of the track 302. The connection point 300 is formed in the tab 311 in some embodiments. In certain embodiments, the connection point 300 includes a hole, slot, groove, recess, or other suitable feature. In some embodiments, a portion or end of the wingbox attachment 310 aligns with the connection point 300 and is coupled thereto via a fastener that extends through the feature (e.g., hole) formed in the connection point 300. In some embodiments, the fastener includes, for example, a bolt, a screw, a rivet, a pin, a bearing, or any other suitable fastener configured to enable the track 302 to move with the wingbox attachment 310 to pivot or rotate about the axis 336.

In some embodiments, the track 302 includes the top surface 304 (defined by a top flange 303 of the track 302), a bottom surface 306 (defined by a bottom flange of the track 302), and opposing C-shaped channels 308. The track 302 also includes a central web 307 that is perpendicular to and extends between the top flange and the bottom flange. Each one of the C-shaped channels 308 is defined between the top flange, the bottom flange, and a corresponding side of the central web. In some embodiments, the C-shaped channels 308 extend along the length of the track 302 from a proximal end portion 332 to a distal end portion 334. In some embodiments, the elongated structure of the track 302 is non-linear. Accordingly, the top surface 304, the bottom surface 306, and/or the C-shaped channels 308 may also be non-linear. For example, in some embodiments, the distal end portion 334 of the track is at least partially downwardly curved such that the track 302 forms an inverted J-shape relative to the aircraft wing 102.

In some embodiments, the track 302 is monolithically formed as a single unit. In other embodiments, as discussed in more detail below, with reference to FIG. 4, two or more halves, sections, and/or portions of the track 302 may be mechanically coupled together, via any suitable mechanism or technique, to collectively form the track 302.

In some embodiments, the flap carriage 312 is movably engaged with the track 302 and coupled to a flap 104 (e.g., a corresponding one of the flaps 104A-C). In some embodiments, the flap carriage 312 is retained within the track 302 and moved along a length of the track 302 via one or more pairs of rollers (e.g., primary rollers 322 and secondary rollers 324). In this manner, moving the flap carriage 312 along the track 302 also moves the flap 104 along a path defined by the C-shaped channels 308. Further, moving the flap carriage 312 along a non-linear path defined by the C-shaped channels 308 also moves the flap 104 along (e.g., parallel to) the non-linear path. In some examples, the non-linear path has a J-shape that corresponds with a J-shape of the track 302.

In some embodiments, the flap carriage 312 includes a top portion 314, a bottom portion 316, and an intermediate portion 318 between the top portion 314 and the bottom portion 316. The top portion 314 is above the track 302, the bottom portion 316 is below the track, and the intermediate portion 318 is laterally adjacent the track 302. In certain embodiments, as shown, the flap carriage 312 includes side plates 313, each on an opposing side of the track 302. The side plates 313 have a height greater than a height of the track 302 and a width that is perpendicular to the height of the side plates 313 and the height of the track 302, and parallel to a length of the track 302. The side profile of the side plates 313 are such that the width of the side plates 313 increases or widens from a top of the side plates 313 (i.e., from the top portion 314 of the flap carriage 312) to a bottom of the side plates 313 (i.e., to the bottom portion 316 of the flap carriage 312). Accordingly, in certain examples, the side profile of the side plates 313 has a substantially triangular shape. Of course, the side profile of the side plates 313 can have any of various other suitable shapes.

In some embodiments, the top portion 314 of the flap carriage 312 includes a spherical bearing 320 positioned between the side plates 313 and secured by a pin 506 (shown in FIG. 5) passing through the side plates 313 and the spherical bearing 320. The spherical bearing 320 enables coupling of the flap 104 to the flap carriage 312 and relative motion of the flap 104 relative to the flap carriage 312. In some embodiments, the flap 104 includes a flap bracket 326, which is fixed to the flap 104 (such as via fasteners) and retains the spherical bearing 320 in place relative to the flap 104. The pin 506 passing through the side plates 313 and the spherical bearing 320 also effectively couples the flap bracket 326 to the top portion 314 of the flap carriage 312 by passing through the spherical bearing 320, which is retained by the flap bracket 326. The spherical bearing 320 enables the flap 104 to pivot or rotate into any one or more of an infinite number of orientations relative to the flap carriage 312, and thus relative to the track 302. In this manner, the spherical bearing 320 helps facilitate self-alignment of the flap 104 relative to the flap carriage 312, while also resisting shock loads. In certain embodiments, the spherical bearing 320 is a spherical roller bearing, a spherical plain bearing, a rod end, a spherical ball bearing, or any other suitable spherical bearing known to those in the art.

In some embodiments, the bottom portion 316 of the flap carriage 312 includes a pair of primary rollers 322 configured to roll along the bottom surface 306 of the track 302. In one embodiment, the primary rollers 322 are flight-loaded rollers arranged in a tandem configuration. As defined herein, a tandem configuration is a configuration in which the primary rollers 322 are spaced relative to each other such that the axis of rotation of the rollers are spaced apart along a length of the track 302. In other embodiments, the primary rollers 322 include any suitable arrangement of rollers. In certain embodiments, the bottom surface 306 includes a roller interface configured to maintain the primary rollers 322 in alignment with respect to the bottom surface 306 of the track 302 (e.g., a groove in the bottom surface 306 engages a rib in the primary rollers 322 or vice versa).

In some embodiments, the intermediate portion 318 of the flap carriage 312 includes a pair of secondary rollers 324. Each one of the secondary rollers 324 is configured to roll along an interior surface of the bottom flange 305 defining a corresponding one of the opposing C-shaped channels 308. With the primary rollers 322 rolling along (and pressed against) the bottom surface 306 of the track 302 and the secondary rollers 324 rolling along (and pressed against) the interior surfaces of the bottom flange 305, the bottom flange 305 is pinched between the primary rollers 322 and the secondary rollers 324. Put another way, the primary rollers 322 and the secondary rollers 324 applying counterpressure to the bottom flange 305 helps retain the secondary rollers 324 within the C-shaped channels 308 against the interior surface of the bottom flange 305, and helps retain the primary rollers 322 against the bottom surface 306. Moreover, retention of the primary rollers 322 and the secondary rollers 324 to the bottom flange 305 also retains the flap carriage 312 to the track 302. In some embodiments, the secondary rollers 324 are fixed to one or more stationary features of the flap carriage 312 such that the secondary rollers 324 are retained in alignment with respect to the track 302. For example, as discussed in more detail with reference to FIG. 5 below, each one of the pair of secondary rollers 324 may be coupled to opposing sides of the flap carriage 312.

Figure 4:
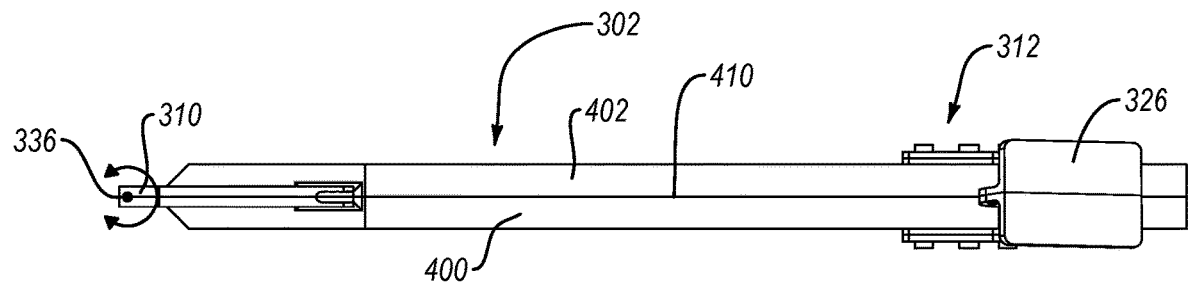
FIG. 4 is a top view of an auxiliary flap assembly, in accordance with one or more examples of the present disclosure.

Referring now to FIG. 4, in some embodiments, the track 302 includes a first half 400 and a second half 402 arranged in a back-to-back configuration. In those embodiments where the track 302 is non-linear, each one of the first half 400 and the second half 402 is also non-linear. For example, in certain embodiments, the track 302, including both the first half 400 and the second half 402, includes various undulations or inflections to define a non-linear path.

Each one of the first half 400 and the second half 402 may define a corresponding one of the opposing C-shaped channels 308. Moreover, each one of the first half 400 and the second half 402 includes a half of the top surface 304 and the bottom surface 306. In some embodiments, each one of the first half 400 and the second half 402 of the track 302 is sufficiently robust so as to support the flap carriage 312 and the flap 104 should one of the first half 400 or the second half 402 fail, thereby also providing redundancy and fail-safety.

When coupled together in a back-to-back configuration, the C-shaped channels 308 of the first half 400 and the second half 402 both face outwardly. Additionally, corresponding sides of (e.g., the webs defining) the C-shaped channels 308 may be positioned adjacent to each other such that the combined first half 400 and second half 402 form the top surface 304 and the bottom surface 306 of the track 302. In some embodiments, the first half 400 and the second half 402 are individually manufactured before being joined together. In other embodiments, the first half 400 and the second half 402 joined together during manufacture of the first half 400 and the second half 402.

In some embodiments, the central web 307 of the first half 400 of the track 302 and the central web 307 of the second half 402 of the track 302 is adjoined via a butt joint. Thus, when viewed from the top, as shown, a single seam 410 may separate the first half 400 from the second half 402. In some embodiments, the first half 400 and the second half 402 are coupled together in the back-to-back configuration by one or more types of fasteners, such as bolts, screws, adhesives, welding, and/or a combination thereof. In some embodiments, the back-to-back configuration of the first half 400 and the second half 402 increase durability of the track 302 as well as reduce complexities and costs of manufacturing and maintenance.

As mentioned previously, some embodiments incorporate a groove, recess, or other feature into the top surface 304 and/or the bottom surface 306 to maintain alignment between the flap carriage 312 and the track 302. In some embodiments, this feature defines at least a portion of the seam 410.

As shown in FIG. 4, in some embodiments, the wingbox attachment 310 aligns with the track 302 (e.g., be confined within a widthwise envelope of the track 302) and enable the track 302 to pivot, relative to the wingbox attachment 310, about an axis that is perpendicular to the width of the track 302. Thus, in some embodiments, the track 302 is pivotable up and down when viewed from the top of the track 302 as shown in FIG. 4.

Figure 5:
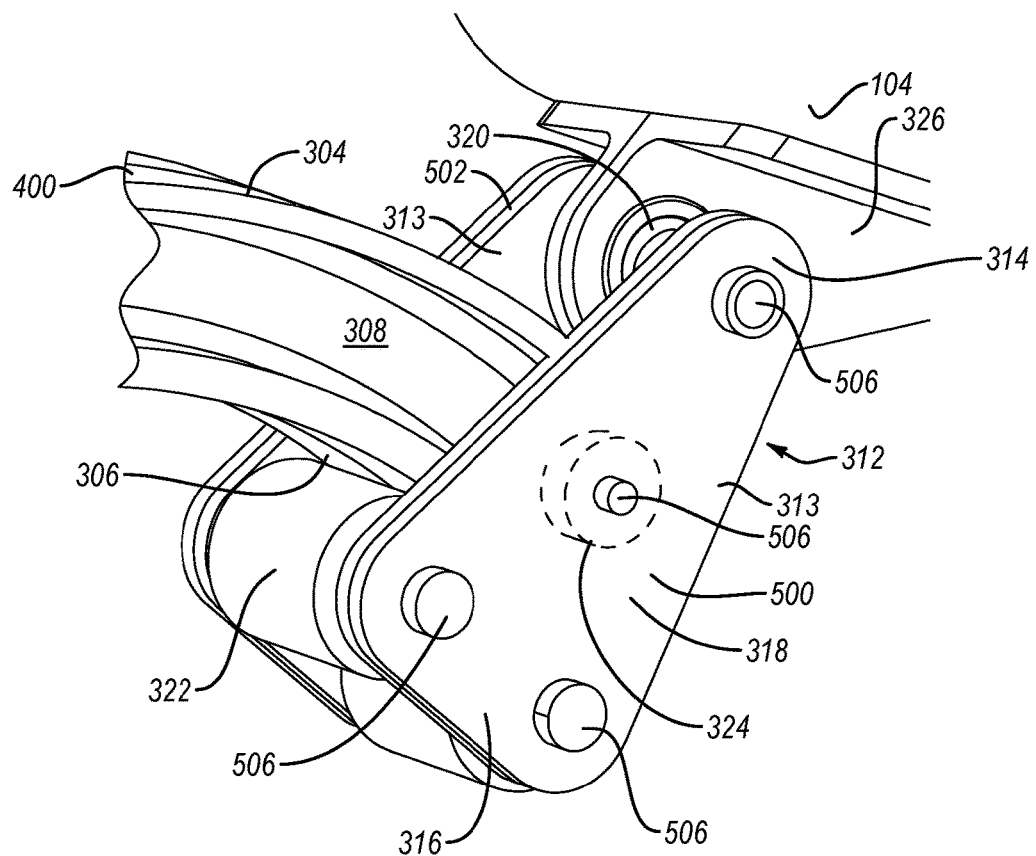
FIG. 5 is an enlarged perspective view of a flap carriage and flap assembly, in accordance with one or more examples of the present disclosure.

Referring now to FIGS. 4 and 5, the flap carriage 312 may be coupled to the track 302 and configured to move along a portion of the length of the track 302. The flap 104 may be configured to rotate and pivot about the flap carriage 312 while the flap carriage 312 is translated along the length of the track 302. In certain embodiments, the pin 506 of the flap carriage 312 includes a pin-in-pin configuration to provide redundancy and failsafety, such as if one of an inner pin or outer pin unexpectedly fails.

Figure 6:
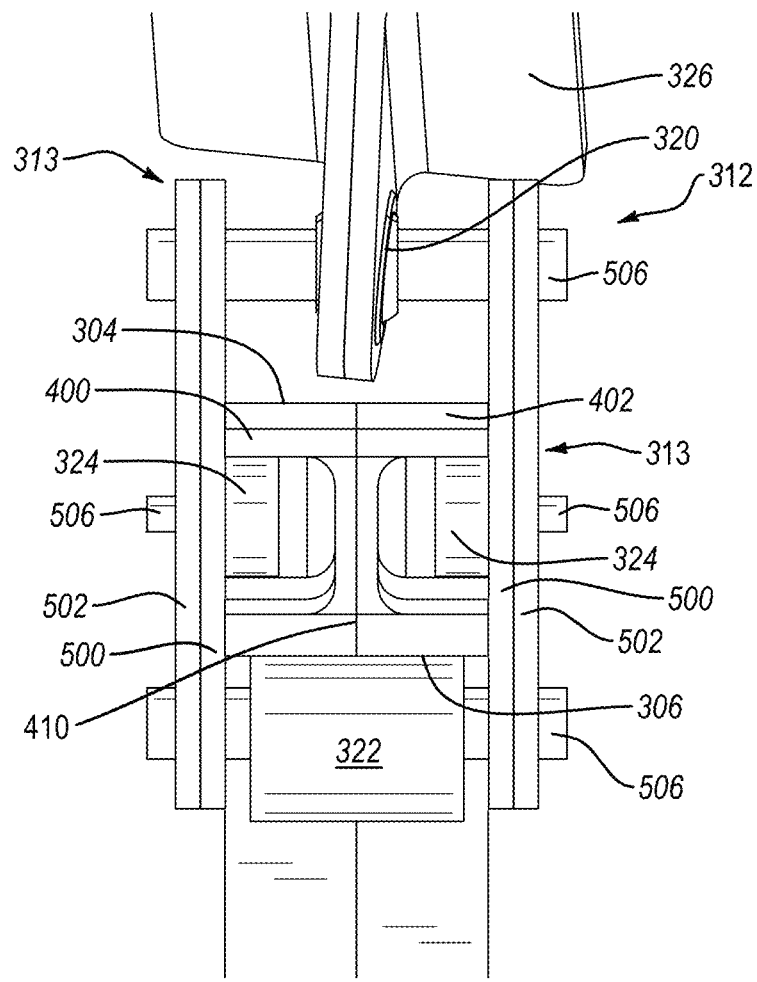
FIG. 6 is a rear end view of the flap carriage of FIG. 5, in accordance with one or more examples of the present disclosure.

Referring to FIGS. 5 and 6, in some embodiments, the flap carriage 312 includes a back-to-back configuration to provide further redundancy and failsafety. More specifically, in some embodiments, each one of the side plates 313 includes a first side plate 500 and a second side plate 502.

In some embodiments, each one of the primary rollers 322 is attached to the first side plate 500 and the second side plate 502, of the corresponding one of the side plates 313, via the pin 506 such that the pin 506 extends perpendicularly relative to the length of the track 302. In some embodiments, the pair of primary rollers 322 are centered with respect to a width of the track 302. Moreover, in some embodiments, the pair of primary rollers 322 are configured to rotate about a corresponding one of the pins 506 to roll along the bottom surface 306 of the track 302 between the proximal end portion 332 and the distal end portion 334 of the track 302.

In some embodiments, the intermediate portion 318 of the flap carriage 312 includes a pair of secondary rollers 324 configured to roll along a C-shaped channel 308 of the track 302. In some embodiments, each of the secondary rollers 324 includes a pin 506 around which the secondary roller 324 may rotate. In certain embodiments, the pin 506 also couples the secondary roller 324 to the flap carriage 312. For example, in some embodiments, one of the pair of secondary rollers 324 is coupled to one of the side plates 313 and the other secondary roller 324 may be coupled to the other side plates 313. In some embodiments, each of the secondary rollers 324 are aligned with one of the opposing C-shaped channels 308 of the track 302. As shown in FIG. 6, in some embodiments, one of the secondary rollers 324 engages the C-shaped channel 308 of the first half 400 of the track 302 and the other secondary roller 324 may engage the C-shaped channel 308 of the second half 402 of the track 302. In this manner, the pair of secondary rollers 324 may be positioned opposite and aligned with each other to provide support to the flap carriage 312 as well as to reduce potential jams during movement of the flap carriage 312 along the track 302. In addition, in certain embodiments, the secondary rollers 324 are implemented with a pair of primary rollers 322, which can be dead-weight or flight-loaded primary rollers, that may further reduce a risk of jamming.

Figure 7:
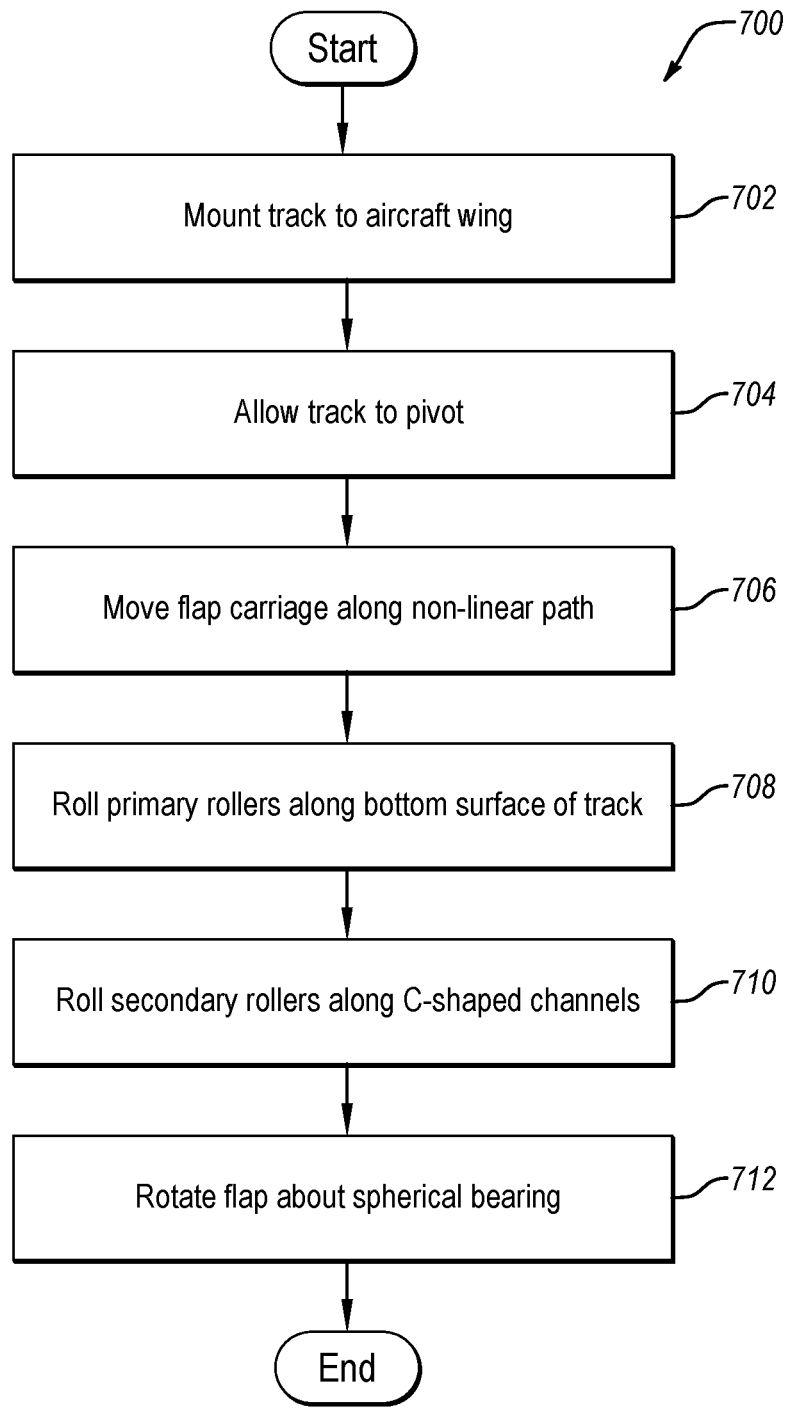
FIG. 7 is a schematic flow chart of a method of moving a flap carriage, according to one or more examples of the present disclosure.

Referring now to FIG. 7, some embodiments, a method 700 of using an auxiliary flap assembly 202 in accordance with the disclosure includes mounting 702 a track 302 to an aircraft wing 102. In some embodiments, the track 302 is mounted to the aircraft wing 102 at a mid-span position or at an end position along the aircraft wing 102. The method 700 further includes allowing 704 the track 302 to pivot relative to the aircraft wing 102. For example, in some embodiments, the track 302 pivots or rotates about an axis parallel to a spanwise direction along the aircraft wing 102.

In some embodiments, the method 700 includes moving 706 a flap carriage 312 along a non-linear path defined by the track 302, so that a flap 104A-C coupled to the flap carriage 312 also moves along the non-linear path. In some embodiments, moving 706 the flap carriage 312 along the non-linear path includes rolling 708 a pair of primary rollers 322 along a bottom surface 306 of the track 302 and rolling 710 a pair of secondary rollers 324 along opposing C-shaped channels 308 of the track 302.

In some embodiments, the method 700 further includes rotating 712 and/or pivoting the flap 104A-C about a spherical bearing 320 into any one or more of an infinite number of orientations relative to the flap carriage 312. In some embodiments, rotating 712 the flap 104A-C about the spherical bearing 320 includes rotating a flap bracket 326 coupled to the flap 104A-C about a spherical bearing 320. In some embodiments, the method 700 moves the flap 104A-C in a downward angle relative to the aircraft wing 102 between, and inclusive of, a stowed position and a deployed position.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. An auxiliary flap assembly for an aircraft wing having a flap, comprising:
   a track configured to be coupled to the aircraft wing, comprising a top surface, a bottom surface, and opposing C-shaped channels, and being elongated along a length of the track, wherein the track comprises a first half and a second half coupled together in a back-to-back configuration along a seam extending the length of the track and separating the opposing C-shaped channels, wherein each one of the first half and the second half defines a corresponding one of the opposing C-shaped channels, which face opposite directions relative to each other;
   a wingbox attachment configured to be attached to the aircraft wing and to the track, such that the track is pivotable relative to the aircraft wing; and
   a flap carriage movably engaged with the track such that the flap carriage is retained by the track and movable along the length of the track, the flap carriage comprising a top portion, a bottom portion, and an intermediate portion between the top portion and the bottom portion, wherein:
      the top portion comprises a spherical bearing and is configured to be coupled to the flap via the spherical bearing;
      the bottom portion comprises a pair of primary rollers configured to roll along the bottom surface of the track;

each primary roller of the pair of primary rollers spans the seam; and the intermediate portion comprises a pair of secondary rollers each configured to roll along a corresponding one of the opposing C-shaped channels.

2. The auxiliary flap assembly of claim 1, wherein the flap carriage comprises a first side plate, a second side plate, and a pin, wherein the pin extends through the spherical bearing to couple the first side plate to the second side plate.

3. The auxiliary flap assembly of claim 2, wherein the pin comprises a pin-in-pin configuration.

4. The auxiliary flap assembly of claim 1, wherein the track is non-linear, and wherein the top surface, the bottom surface, and each one of the opposing C-shaped channels are non-linear.

5. The auxiliary flap assembly of claim 4, wherein the track has an inverted J-shape.

6. The auxiliary flap assembly of claim 1, wherein the pair of primary rollers comprises two flight-loaded rollers arranged in a tandem configuration.

7. The auxiliary flap assembly of claim 1, wherein the pair of primary rollers are:
offset from each other in a direction parallel to the length of the track; and
centered at a middle of the track defined between the opposing C-shaped channels.

8. The auxiliary flap assembly of claim 1, wherein the wingbox attachment is co-pivotable with the track relative to the aircraft wing about an axis perpendicular to a spanwise direction and a chordwise direction along the aircraft wing.

9. An aircraft, comprising:
an aircraft wing;
a flap coupled to the aircraft wing; and
a flap assembly coupling the flap to the aircraft wing, the flap assembly comprising:
a track coupled to the aircraft wing, comprising a top surface, a bottom surface, and opposing C-shaped channels, and being elongated along a length of the track, wherein the track comprises a first half and a second half coupled together in a back-to-back configuration along a seam extending the length of the track and separating the opposing C-shaped channels, wherein each one of the first half and the second half defines a corresponding one of the opposing C-shaped channels, which face opposite directions relative to each other;
a wingbox attachment attached to the aircraft wing and to the track, such that the track is pivotable relative to the aircraft wing; and
a flap carriage movably engaged with the track such that the flap carriage is retained by the track and movable along the length of the track, the flap carriage comprising a top portion, a bottom portion, and an intermediate portion between the top portion and the bottom portion, wherein:
the top portion comprises a spherical bearing and is coupled to the flap via the spherical bearing;
the bottom portion comprises a pair of primary rollers configured to roll along the bottom surface of the track;
each primary roller of the pair of primary rollers spans the seam; and
the intermediate portion comprises a pair of secondary rollers each configured to roll along a corresponding one of the opposing C-shaped channels.

10. The aircraft of claim 9, wherein the flap carriage comprises a first side plate, a second side plate, and a pin, wherein the pin extends through the spherical bearing to couple the first side plate to the second side plate.

11. The aircraft of claim 10, wherein the flap assembly further comprises a flap bracket attached to the flap, and wherein the spherical bearing is retained by the flap bracket.

12. The aircraft of claim 9, wherein the track is non-linear, and wherein the top surface, the bottom surface, and each one of the opposing C-shaped channels are non-linear.

13. The aircraft of claim 9, wherein the track has an inverted J-shape.

14. The aircraft of claim 9, wherein the pair of primary rollers comprises two flight-loaded rollers arranged in a tandem configuration.

15. The aircraft of claim 9, wherein the wingbox attachment is attached to the aircraft wing at one of a mid-span position and an end position along the wing.

16. The aircraft of claim 9, wherein a fairing is coupled to the aircraft wing at a position of the flap assembly.

17. The aircraft of claim 9, wherein the wingbox attachment is co-pivotable with the track relative to the aircraft wing about an axis perpendicular to a spanwise direction and a chordwise direction along the aircraft wing.

18. A method, comprising:
moving a flap carriage along a non-linear path defined by a track, so that a flap, coupled to the flap carriage, also moves along the non-linear path;
when moving the flap carriage along the non-linear path, rotating the flap about a spherical bearing into any one or more of an infinite number of orientations relative to the flap carriage; and
pivoting the track, relative to the aircraft wing, about an axis perpendicular to a spanwise direction and a chordwise direction along the aircraft wing;
wherein moving the flap carriage comprises rolling each primary roller of a pair of primary rollers of the flap carriage along and over a seam defined between a first half and a second half of the track joined together along the seam.

19. The method of claim 18, further comprising mounting the track to an aircraft wing at one of a mid-span position and an end position along the aircraft wing.

20. The method of claim 18, wherein moving the flap carriage along the non-linear path comprises rolling a pair of primary rollers along a bottom surface of the track and rolling a pair of secondary rollers along opposing C-shaped channels of the track.

* * * * *